United States Patent [19]

Mann et al.

[11] 4,006,946
[45] Feb. 8, 1977

[54] SWING MOUNTING FOR CEMENT MIXER AND THE LIKE

[75] Inventors: Egon Mann; Manfred Fischer, both of Friedrichshafen, Germany

[73] Assignee: Zahnradfabrik Friedrichshafen AG, Friedrichshafen, Germany

[22] Filed: Aug. 22, 1975

[21] Appl. No.: 606,945

[52] U.S. Cl. ............................. 308/194; 308/207 R
[51] Int. Cl.² ......................................... F16C 21/00
[58] Field of Search ...... 308/194, 196, 202, 207 R, 308/217, 6 R; 259/176

[56] References Cited

UNITED STATES PATENTS

| | | | |
|---|---|---|---|
| 2,683,026 | 7/1954 | Preszler | 308/194 X |
| 3,850,485 | 11/1974 | Zimmer | 308/194 |
| 3,926,481 | 12/1975 | Riegler et al. | 308/207 R X |

*Primary Examiner*—Philip Goodman
*Assistant Examiner*—Gene A. Church
*Attorney, Agent, or Firm*—Karl F. Ross; Herbert Dubno

[57] ABSTRACT

A roller bearing for the shaft of a cement-mixer drum, universally jointed on a stub shaft of a planetary-gear train driving the drum shaft through a gear coupling with arcuate teeth, has an inner race fixed to the drum shaft and an outer race secured to a surrounding transmission housing, this outer race being axially split into two halves each accommodating a set of barrel-shaped rollers. The two sets of rollers are held in respective cages, peripherally offset from each other, and are engaged by toroidal inner surfaces of the two race halves curved about the center of rotation of the universal joint; these race halves extend axially beyond the end faces of the inner race to allow for a swing of more than ±3° from a midposition. The outer cage diameter exceeds the smallest diameter of each race half.

8 Claims, 2 Drawing Figures

SWING MOUNTING FOR CEMENT MIXER AND THE LIKE

FIELD OF THE INVENTION

Our present invention relates to a mounting for a load shaft which is driven from a motor or other prime mover through a transmission in a housing with freedom of limited nutation about a predetermined reference point on the shaft axis. Such a swing mounting is particularly useful in the case of cement mixers and similar heavy-duty equipment in which a rotatable load, e.g. a mixer drum, is subjected to considerable gravitational deformation between widely spaced-apart supports, one of them being a driven shaft, with resulting major angular disalignment between the shaft axis and the transmission axis.

BACKGROUND OF THE INVENTION

It is known, e.g. from German utility model No. 7,219,776, to drive the shaft of a mixer drum via a planetary-gear train through a gearing with arcuate teeth, the drum shaft being externally journaled in a roller bearing with an outer race forming a toroidal inner guide surface for the rollers; by way of further support, the drum shaft is coupled with a stub shaft of the planetary-gear train through a universal joint which is concentric with the toroidal guide surface of the outer bearing race. This concentric arrangement allows for a certain relative swing between the two shafts, limited mainly by the tendency of the rollers to escape from the bearing if the outer race moves too far from its midposition relative to the inner race.

OBJECT OF THE INVENTION

The object of our present invention, therefore, is to provide an improved swing mounting for the purpose set forth which enables the angular offset between the transmission and load axes to be increased, e.g. up to or beyond ± 3° from the normal mid-position, without the risk of disintegration of the roller bearing.

SUMMARY OF THE INVENTION

We realize this object, in accordance with our present invention, by axially splitting the outer annular bearing race into two halves each having a toroidal inner guide surface whose arcuate generatrices are curved about a predetermined reference point on the axis of the load shaft, the axial length of the outer race substantially exceeding that of the inner race so as to keep the interposed barrel-shaped rollers confined between the two races upon a swing to either side from a relative mid-position of these two races. More particularly, with the circular outer edges of the end faces of the inner race lying on a pair of imaginary cones whose apices coincide with the aforementioned reference point, the guide surfaces of the outer race extend beyond these end faces to substantially be two imaginary cones so as to define, in cross-section, a sector encompassing the profile of the bearing surface of the inner race. With a sufficient clearance provided on either side of the roller bearing to let the outer race swing into an eccentric position in which one or the other guide surface thereof terminates about flush with the corresponding end face of the inner race, the rollers will be unable to escape throughout the swing range.

Advantageously, the two sets of rollers are engaged by respective annular cages which are relatively angularly staggered with peripheral interleaving of their roller sets, the maximum diameter of each cage being greater than the minimum diameter of the respective guide surface. Thanks to the splitting of the outer race, this relative dimensioning creates no problem of assembly or disassembly of the roller bearing.

BRIEF DESCRIPTION OF THE DRAWING

Our invention will now be described in greater detail with reference to the accompanying drawing in which.

SPECIFIC DESCRIPTION

Figure 1:
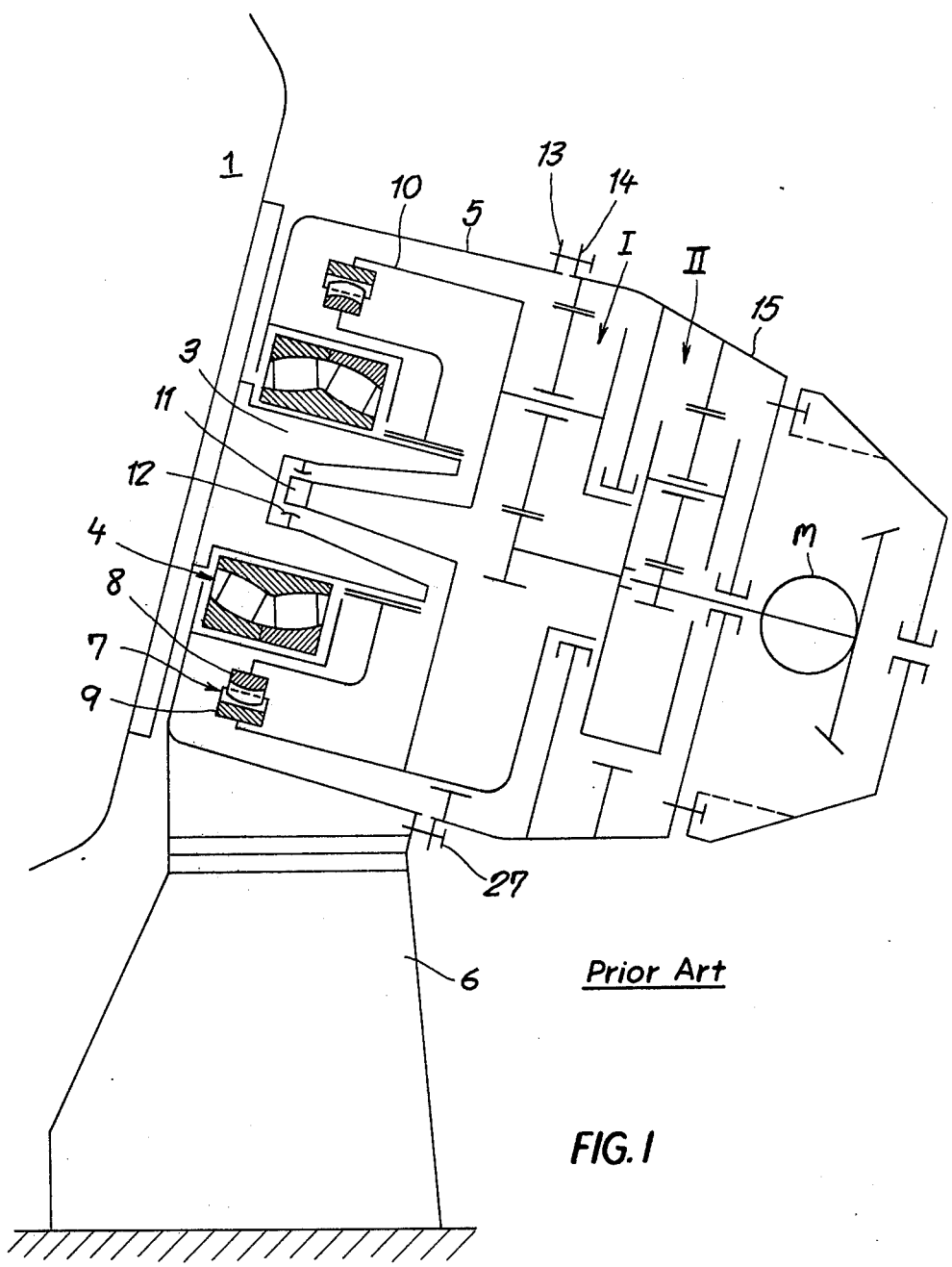
FIG. 1 is a diagrammatic view of a mounting for the shaft of a mixer drum, generally as known from the aforementioned German utility model No. 7,219,776.

In FIG. 1 we have shown part of a mixing drum 1 whose shaft 3 is journaled in a surrounding roller bearing 4 secured to a transmission housing 5 which in turn is carried on a base 6. A planetary-gear train with two stages I, II includes a planet carrier 10 which transmits the torque of a motor M through an arcuate gearing 7 to the shaft 3; the latter is internally supported on a stub shaft 11, rigid with planet carrier 10, via a universal joint 12. Gearing 7 includes a spur gear 8 and a surrounding ring gear 9 in mesh therewith, the teeth of the spur gear being arcuately curved about the center of universal joint 12. A flange 13 of transmission housing 5 is detachably connected with a flange 14 of a housing extension 15 by means of bolts 27. Upon a separation of the two flanges, the planetary-gear train I, II with its carrier 10 and the shaft 11 thereof can be disengaged from the drum shaft 3 which then remains journaled in housing 5 through roller bearing 4. During assembly, the arcuate shape of the teeth of gear 8 helps guide the carrier 10 into its correct position. Flexural stresses due to the weight of the drum 1 are absorbed by the transmission housing 5 and its base 6, without affecting the planetary-gear train. An oil pool may be provided between housing 5 and its extension 15.

Figure 2:
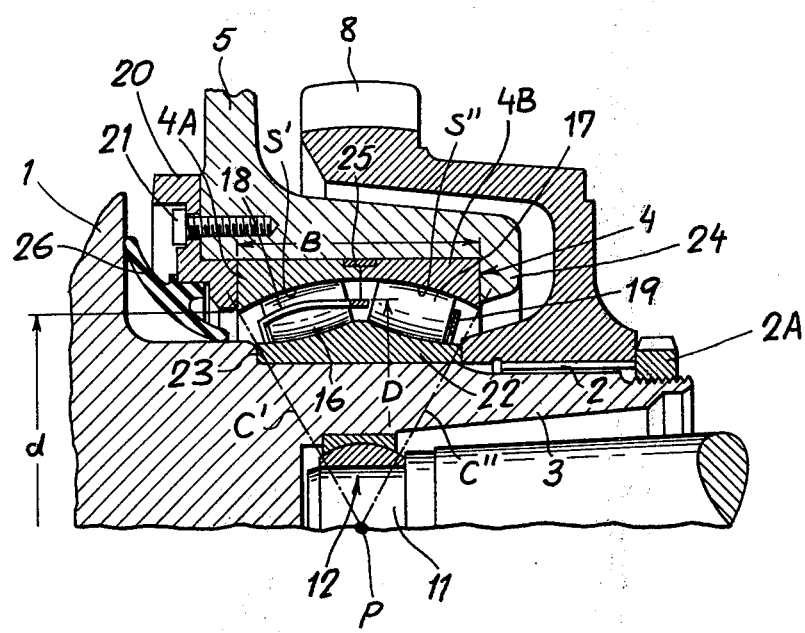
FIG. 2 is a fragmentary axial section of a roller bearing according to our invention and adjacent parts adapted to be used in the assembly of FIG. 1.

In a bearing assembly according to our invention, as more clearly shown in FIG. 2, gear 8 is splined at 2 to the drum shaft 3 and is held in position thereon by a nut 2A. Under pressure of this nut, the hub of gear 8 clamps in position an inner race 22 of roller bearing 4 forming two concave raceways and resting against a shoulder 23 of the shaft 3. The outer bearing race is split into two halves 4A and 4B forming toroidal guide surfaces S', S'' for two sets of barrel-shaped rollers 16, 17, the rollers of each set being held separated by a respective annular cage 18, 19 as is well known per se. The two roller cages 18, 19 are angularly offset so that their respective rollers 16, 17 are peripherally interleaved. The generatrices of the toroidal guide surfaces S', S'' are curved about a reference point P on the axis of shaft 3, i.e. the center of joint 12, and project axially beyond the end faces of inner bearing race 22. Two imaginary cones C' and C'' are defined by point P and by the circular outer edges of the two end faces of race 22; it will be seen that the guide surfaces S', S'' terminate substantially at these imaginary cones. Race halves 4A and 4B are held in position between a ring 20, secured to housing 5 by screws 21, and a flange 24 of that housing. In the illustrated embodiment, the axial width B of outer race 4A, 4B is approximately equal to three times the length of each roller 16, 17.

The minimum diameter $d$ of the inner guide surface $S'$ or $S''$ is less than the maximum outer diameter $D$ of cages 18 and 19. The two race halves 4A and 4B are interconnected, prior to insertion into housing 5, by a metal band 25 shrunk into a pair of adjoining peripheral recesses thereof. An annular sealing lip 26 is interposed as a bumper between the transverse wall of drum 1 and the mounting ring 20 to prevent any excursions of shaft 3 from its center position beyond a predetermined swing angle which may be greater than $\pm 3°$. Upon the emplacement of bearing 4, the assembly can be completed by the interconnection of flanges 13 and 14 with the aid of the bolts 27 as described above.

We claim:

1. A mounting for a load shaft driven from a prime mover through a transmission in a housing with freedom of limited nutation about a predetermined reference point on the shaft axis, comprising an annular inner race with two concave raceways secured to said load shaft, an annular outer race fixedly secured to said housing and axially split into two halves each having a toroidal inner surface with arcuate generatrices curved about said reference point, and two sets of barrel-shaped rollers respectively interposed between the guide surfaces of said halves and the raceways of said inner race, said outer race being of substantially greater axial width than said inner race for keeping said rollers confined upon a relative swing of said races to either side of a mid-position.

2. A mounting as defined in claim 1 wherein the axial width of said outer race approximately equals three times the axial length of said rollers.

3. A mounting as defined in claim 1 wherein each of said sets of rollers is provided with a respective annular cage having a maximum diameter greater than the minimum diameter of the respective guide surface.

4. A mounting as defined in claim 3 wherein said annular cages are relatively angularly staggered with peripheral interleaving of said sets of rollers.

5. A mounting as defined in claim 1 wherein said transmission is provided with a stub shaft connected with said load shaft through a universal joint on said reference point.

6. A mounting as defined in claim 1 wherein said outer race is surrounded by enough clearance to enable a relative swing of said races from said midposition in excess of $\pm 3°$.

7. A mounting as defined in claim 1, further comprising resilient bumper means engageable by said outer race in either of two limiting positions.

8. A mounting as defined in claim 1 wherein said inner race has a pair of end faces with outer edges lying on a pair of imaginary cones with apices on said reference point, said guide surfaces extending axially beyond said end faces to substantially said imaginary cones in said midposition.

* * * * *